United States Patent [19]

Zell

[11] Patent Number: 5,326,050

[45] Date of Patent: Jul. 5, 1994

[54] AERODYNAMIC SURFACE DISTENSION SYSTEM FOR HIGH ANGLE OF ATTACK FOREBODY VORTEX CONTROL

[75] Inventor: Peter T. Zell, San Jose, Calif.

[73] Assignee: The United States of America as represented by the Administrator of National Aeronautics and Space Administration, Washington, D.C.

[21] Appl. No.: 14,584

[22] Filed: Feb. 8, 1993

[51] Int. Cl.⁵ .............................................. B64C 5/00
[52] U.S. Cl. .................................. 244/75 R; 244/199
[58] Field of Search ................ 244/75 R, 75 A, 199, 244/213, 134 A, 201, 204

[56] References Cited

U.S. PATENT DOCUMENTS

| | | | |
|---|---|---|---|
| 2,011,902 | 8/1935 | Leigh | 244/213 |
| 2,378,528 | 6/1945 | Arsandaux | 244/219 |
| 2,601,962 | 7/1952 | Douglas | 244/201 |
| 2,912,190 | 11/1959 | MacDonough | 244/214 |
| 2,924,400 | 2/1960 | Ruget | 244/203 |
| 2,932,470 | 4/1960 | Edkins | 244/219 |
| 3,136,501 | 6/1964 | Barber | 244/219 |
| 3,586,267 | 6/1971 | Ingelman-Sundberg | 244/215 |
| 4,786,009 | 11/1988 | Rao et al. | 244/75 R |
| 4,917,333 | 4/1990 | Murri | 244/75 R |

FOREIGN PATENT DOCUMENTS

| | | | |
|---|---|---|---|
| 840312 | 4/1939 | France | 244/203 |
| 722847 | 2/1955 | United Kingdom | 244/201 |

OTHER PUBLICATIONS

"Development of Actuated Forebody Strake Controls . . . " by D. G. Murri et al Oct. 1990 High Angle of Attack Conference-NASA Langley Research Center.

Primary Examiner—Michael S. Huppert
Assistant Examiner—Anne E. Bidwell
Attorney, Agent, or Firm—Darrell G. Brekke; Guy Miller; John R. Manning

[57] ABSTRACT

A deployable system for assisting flight control under certain flight conditions, such as at high angles of attack, whereby two inflatable membranes are located on the forebody portion of an aircraft on opposite sides thereof. The members form control surfaces for effecting lateral control forces if one is inflated and longitudinal control forces if both are inflated.

11 Claims, 5 Drawing Sheets

AERODYNAMIC SURFACE DISTENSION SYSTEM FOR HIGH ANGLE OF ATTACK FOREBODY VORTEX CONTROL

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates generally to the field of aerodynamics and, more specifically, to an aerodynamic surface distension system for high angle of attack forebody vortex control. Basically, a fluid-filled flexible member alters the shape of a forebody portion of an aircraft or similar vehicle to effect aerodynamic forces and moments, thus providing control forces at high angle of attack.

TECHNICAL FIELD OF THE INVENTION

Various devices have been employed to vary the aerodynamic shape of an aircraft control surface to adapt to certain flight condition. Notable examples include the high lift systems associated with multiple element wing structures employing trailing edge flaps and leading edge slats. When greater lift is required for take-off and landing, for example, mechanical linkages are used to move the rigid movable elements into deflected, operable positions.

Non-rigid control surfaces have been considered in the past for changing the aerodynamic features of an aircraft surface. For example, U.S. Pat. No. 2,378,528 to Arsandaux describes a wing having a leading edge and a trailing edge, and an inflatable member disposed in the leading edge. The inflatable member is inflated in order to enhance the lift-generating capabilities of the wing.

U.S. Pat. No. 2,912,190 to MacDonough describes another leading edge contour-changing device which utilizes an inflatable member to change the shape of the wing. The altered shape is intended to generate greater lift under certain flight conditions. A rigid member pivots outwardly to cooperate with the inflatable member in defining the altered shape of the airfoil.

U.S. Pat. No. 2,932,470 to Edkins describes an inflatable member located at the leading edge of an airfoil. This patent recognizes that a more blunted leading edge profile is suitable for certain combat maneuvers which impose high G forces, and which require operation at high positive angles of attack at relatively high Mach numbers, in the range of 0.9.

U.S. Pat. No. 3,136,501 to Barber describes an inflatable member disposed midway between the leading and trailing edges of a wing, on the suction side thereof. The inflatable member is inflated to cause an increase in lift generated by the wing under certain flight conditions.

The aforementioned non-rigid inflatable members are all associated with the primary lift-generating structure of the aircraft, and are not suggested for use on control surfaces, meaning surfaces that are responsible for determining the flight direction of the aircraft. It has been found that at high angles of attack, the conventional control surfaces loose effectiveness. Thus, it has been proposed to install deployable rigid control surfaces or "strakes" on the forebody of the aircraft. However, these hinged, rigid aerodynamic control surfaces have certain inherent disadvantages in that they require mechanical actuation and linkages. This actuation structure is incompatible with the intended and normal uses of the forebody interior, which typically houses radar components and other sophisticated electronics. Thus, it is important not to provide structure which demands valuable space in the forebody area of the aircraft.

Blowing air out of a slot or orifice on the forebody of an aircraft has been considered for creating an aerodynamic force. This approach also has inherent disadvantages in that it would require air to be taken either from the jet engine or an outside source. If taken from the engine, the performance of the engine will be adversely affected. An internal air source and/or internal ducting system that would be required for air blowing would take up valuable space in the forebody area. Moreover, complex systems such as radar would be disturbed.

Thus, a continuing need exists for a control device deployable from the forebody area of an aircraft when operating in high angles of attack.

SUMMARY OF THE INVENTION

An object of the present invention is to provide an aerodynamic surface distension system capable of being mounted on the surface of the forebody of an aircraft, and requiring a minimal amount of space within the forebody.

Another object of the present invention is to provide an aerodynamic surface distension system capable of being mounted on the forebody of the aircraft without adversely affecting radar components located in the forebody region of the aircraft.

Still another object of the present invention is to provide an aerodynamic surface distension system which requires a minimal amount of energy derived from the aircraft power plant, thus minimizing adverse affects on power plant performance.

Yet another object of the present invention is to provide an aerodynamic surface distension system which to effect yaw and pitch control forces is capable of rapid deployment to an operative position.

These and other objects of the invention are met by providing an aerodynamic surface distension system for supplying a control force to an aircraft while maneuvering at high angles of attack, the system comprising at least one deployable control surface disposed on a forebody portion of the aircraft and being substantially flush with an outer surface of the forebody portion in a non-deployed position and extending radially outwardly of the forebody outer surface when in a deployed position, and inflatable means for moving the at least one deployable control surface from the non-deployed position to the deployed position. Deployment of one such control surface can be used to effect a lateral control force.

In another aspect of the invention, two deployable control surfaces disposed symmetrically about the forebody of an aircraft can be deployed simultaneously to effect longitudinal or pitch control forces.

Other objects, advantages and salient features of the invention will become apparent from the following detailed description, which, taken in conjunction with the annexed drawings, discloses preferred embodiments of the invention.

DETAILED DESCRIPTION OF THE INVENTION

Figure 1:
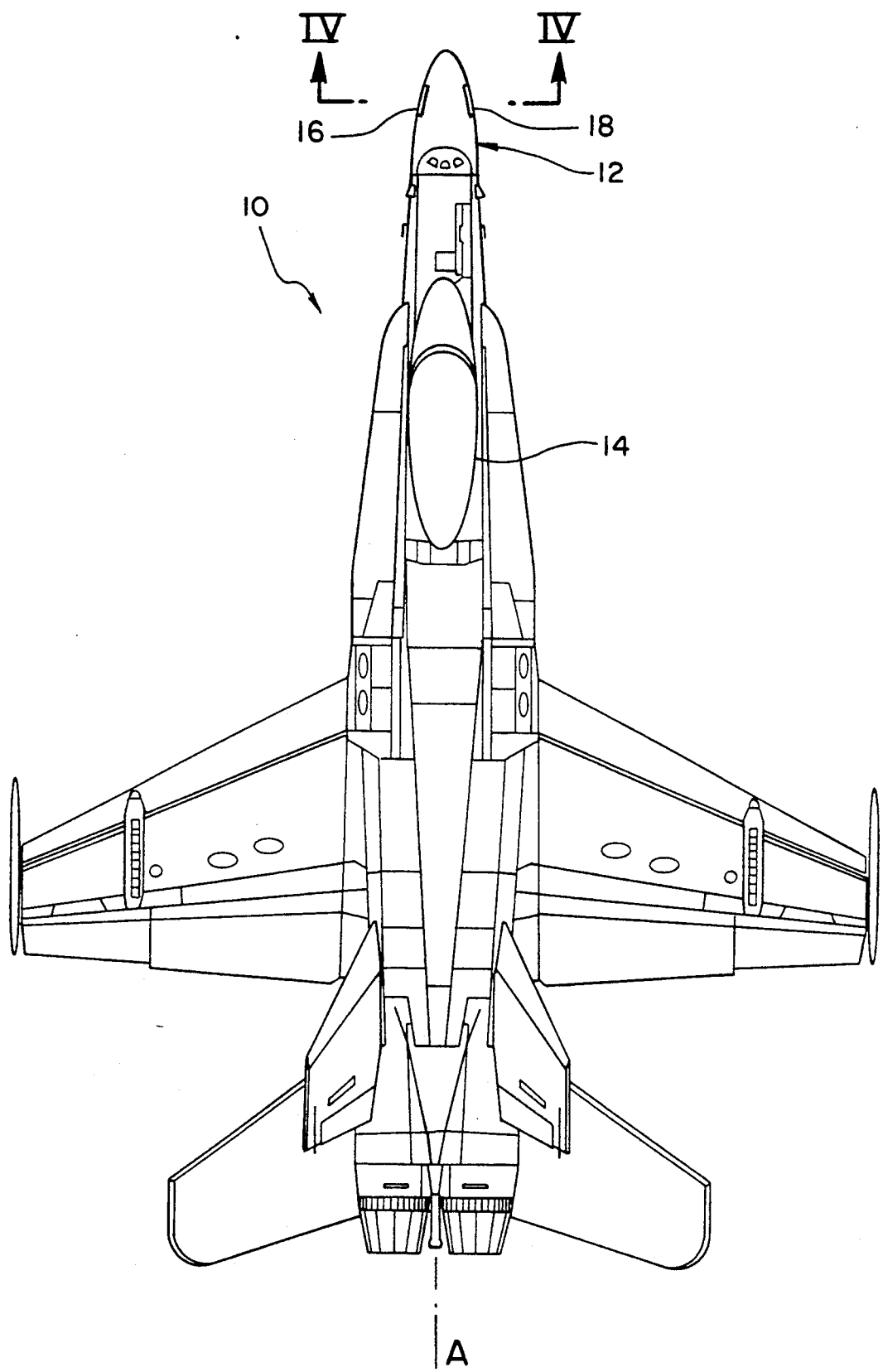
FIG. 1 is a top plan of an aircraft employing the surface distention system for high angle of attack forebody vortex control according to the present invention.

Referring initially to FIGS. 1–4, an airplane 10 has a forebody portion 12 forward of the cockpit 14. A pair of inflatable members 16 and 18 are disposed on opposite sides of the forebody 12, symmetrically about the vertical center plane "A" of the aircraft 10. The port-side inflatable member 16, illustrated in detail in FIGS. 3 and 4, includes an inflatable membrane 20 made of a resilient polymeric material. Any elastic material having the qualities of high strength and heat resistance can be employed, especially those have the elastic properties of natural rubber. Any of a number of commercially available polymers can be used, including various natural and synthetic compounds of usually high molecular weight consisting of up to millions of repeated linked units, each unit having a relatively light and simple molecule.

Figure 4:
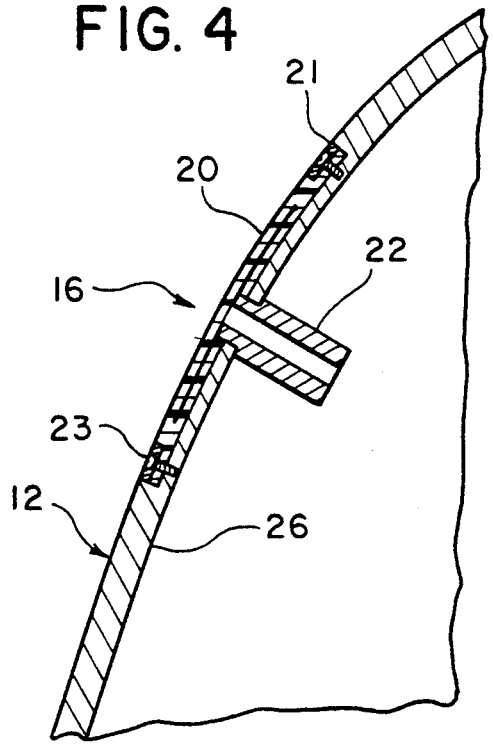
FIG. 4 is an enlarged cross-sectional view taken along line III—III of FIG. 2, and showing the first embodiment of the present invention in a non-deployed or deflated position.
Figure 3:
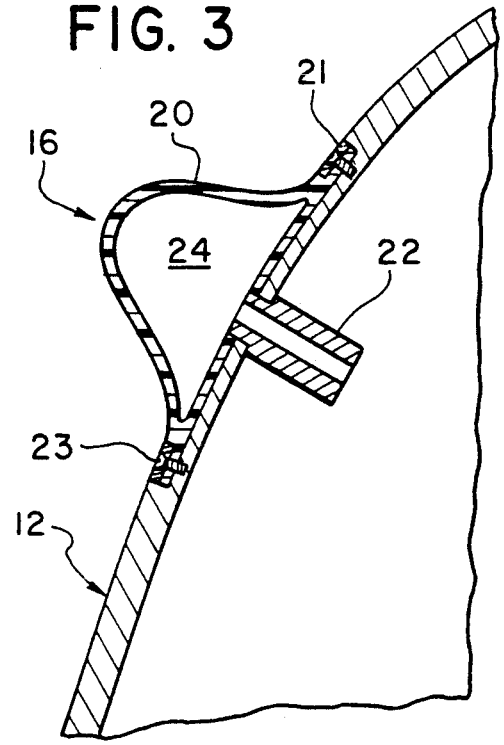
FIG. 3 is an enlarged cross-sectional view taken along line III—III of FIG. 2, and showing a first embodiment of the present invention in a deployed or inflated position.

As seen in FIGS. 3 and 4, the inflatable member 16 is fixedly connected to the forebody portion 12 by fitting into a recess formed in the forebody portion 12. A metal clamping frame 21 encircles the inflatable member 16 and presses tightly against a peripheral flange portion thereof. A plurality of screws 23 are used to secure the inflatable member in place. Preferably, the flange region of the inflatable member 16 is fiber reinforced, with fibers embedded in the elastomeric material. The fibers could be nylon, kevlar, or steel. Other fibers having a strengthening effect could be employed.

Figure 2:
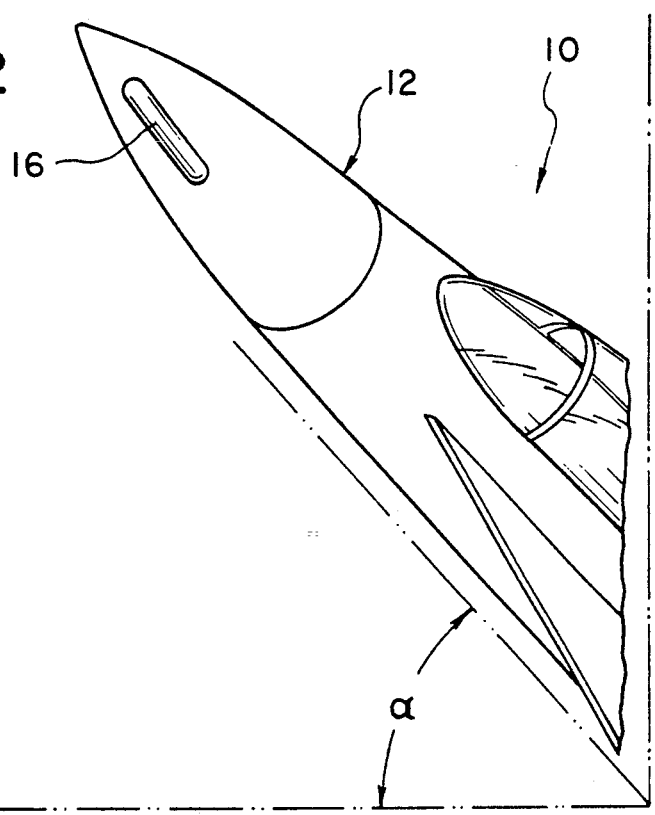
FIG. 2 is an enlarged, left-side perspective view of an aircraft similar to the one illustrated in FIG. 1, and being disposed in a high angle of attack flight attitude.

A fluid coupling 22 is connectable to a source (not shown) to provide the activating fluid, such as air, to a chamber 24 defined by the inner surfaces of the membrane 20. When the membrane 20 is not inflated as seen in FIG. 4, its outer surface is flush with the outer surface of the forebody 12. When inflated, as seen in FIG. 3, the outer surface of the membrane 20 defines a control surface which is capable of generating lateral control forces. For example, at high angle of attack "α" as seen in FIG. 2, deployment of the inflatable member 16 on the port side of the forebody will cause the nose of the aircraft 10 to move in the starboard direction. Distention of either inflatable member 16 or 18 generates a yawing moment by modulating the forebody vortex flow to produce differential suction pressures on the forebody 12. In order to effect longitudinal control forces, or pitch control, both inflatable members 16 and 18 can be deployed simultaneously to a degree necessary to effect the desired amount of pitch control.

Figure 5:
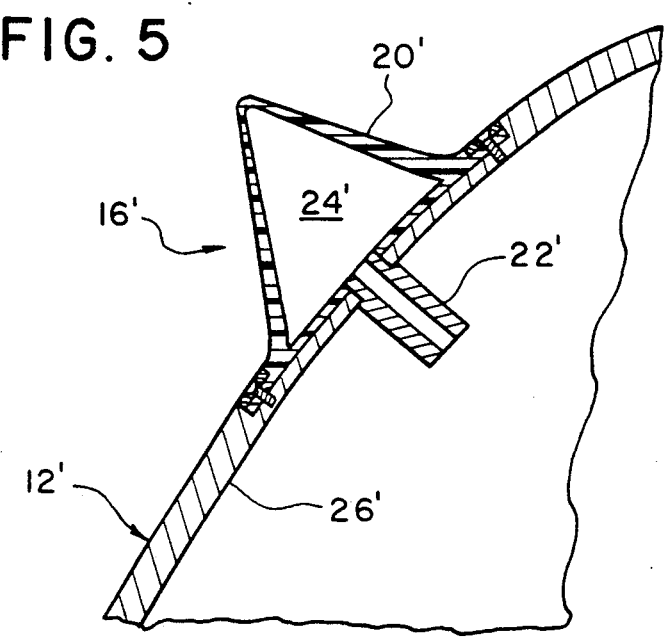
FIG. 5 is a view similar to FIG. 3, but showing another embodiment of the present invention in which the inflatable membrane, when inflated, produces substantially planar control surfaces.

A variation of the first embodiment is illustrated in FIG. 5, in which substantially the same structure is provided, as indicated by primed reference numerals. The membrane 20' of the FIG. 5 embodiment is provided with wall thicknesses that become thinner towards the apex so that when inflated, the outer surfaces of the membrane 20' are more planar and thus present a sharper airflow separation at the apex.

Figure 6:
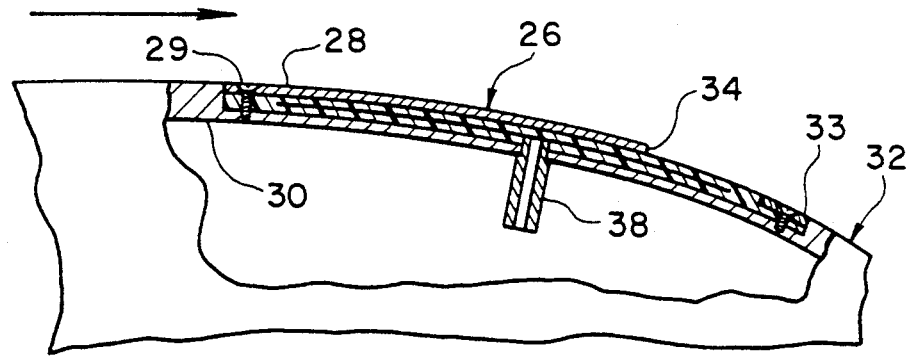
FIG. 6 is a side elevational view, partially cut-away, showing another embodiment of the present invention with the inflatable membrane in a non-inflated condition.
Figure 7:
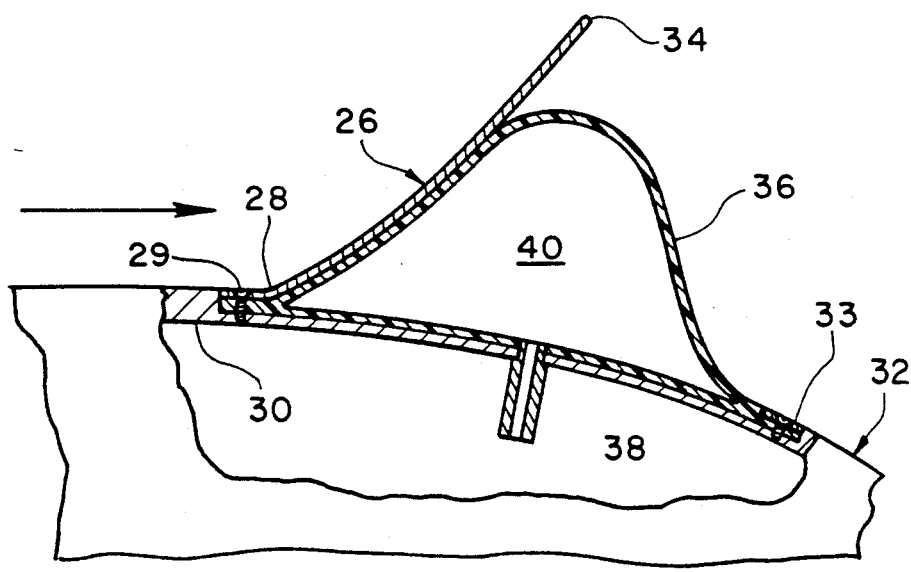
FIG. 7 is a view similar to FIG. 6, with the inflatable membrane in an inflated condition.

Referring now to FIGS. 6 and 7, a further embodiment of the present invention is shown as a deployable flexible member 26 having one end 28 attached to the aerodynamic skin 30 of an aerodynamic structure 32. The aerodynamic structure 32 may be a wing, for example. Attachment may be accomplished by means of threaded fasteners 29 or any other suitable means. Alternatively, the flexible member 26 could be a continuous extension of the forebody surface material and thus fasteners would not be required. The opposite end 34 of the deployable member 26 is free.

In the inactive position illustrated in FIG. 6, the flexible member 26 conforms in shape to the aerodynamic surface of the aerodynamic structure 32. Air flow is indicated by the directional arrow in both FIGS. 6 and 7.

An inflatable membrane 36 is secured in a recess of the aerodynamic skin 30 and is fixedly connected thereto by a frame 33 clamping the periphery of the inflatable member 36 along the free end of the deployable member 26. At the connected end, the periphery of the inflatable member 36 is clamped by the screws 29 and the flexible member 26. Suitable bonding adhesives may be employed instead of the clamping structures to secure the inflatable member 36 within the recess. Any other suitable means may be employed to secure the inflatable member 36 in place.

The inflatable membrane 36 is bonded or otherwise suitably attached to an inner surface of the flexible member 26 so that as the membrane is inflated, as seen in FIG. 7, by introducing fluid such as air into the membrane through fluid coupling 38, the flexible member 26 is caused to move radially outwardly to an operative position. To ensure conformity of the flexible member 26 to the shape of the aerodynamic skin 30 when the membrane 36 is deflated, a vacuum can be administered to the chamber 40 through the fluid coupling 38.

In any of the above embodiments involving forebody control surfaces, it is preferable to provide two inflatable membranes, one on each side of the vertical plane A. Moreover, a preferred location can be determined for individual aircraft, depending on flight characteristics. The exact length and location of the inflatable strakes can be selected with minimal experimentation. One particularly preferred embodiment would locate the inflatable members opposed to each other at about 90° from the vertical plane A.

In the above embodiments where two inflatable members are disposed on the forebody, inflation of one or the other will result in a lateral or yaw control force. The control force moves the aircraft in a direction opposite the side of the deployed inflatable member. For example, a port side deployment will result in a starboard yaw movement of the aircraft. However, simultaneous deployment of both inflatable members will result in longitudinal or pitch movement of the aircraft.

While deployment of either or both of the inflatable members as described above have particular utility when operating an aircraft at high angles of attack, the purpose is to generate control forces. Thus, deployment under conditions other than high angles of attack are also contemplated.

Figure 8:
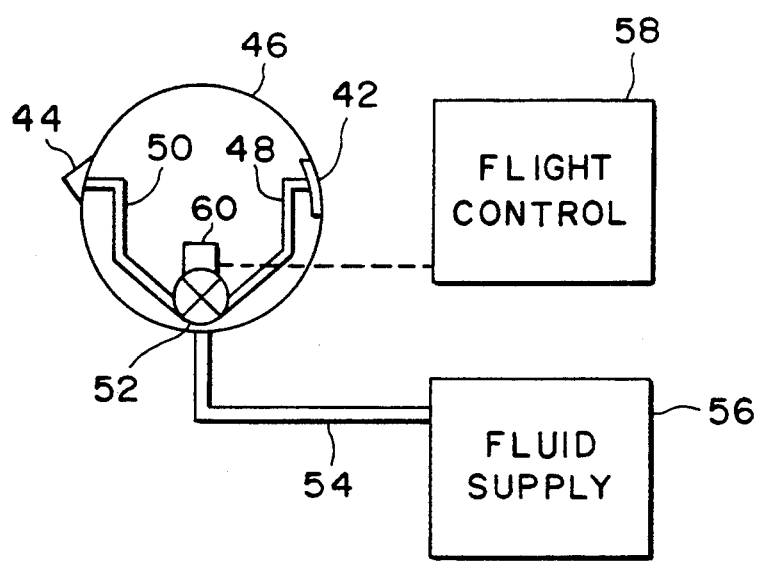
FIG. 8 is a schematic view showing the surface distention system of the present invention.

FIG. 8 schematically illustrates the surface distention system of the present invention including two inflatable members 42 and 44 on opposite sides of an aircraft forebody 46. The port side inflatable member 44 is shown in the inflated condition to effect yaw control of the aircraft. Both of the inflatable members are coupled through fluid lines 48 and 50, respectively, to a control valve 52 which itself is coupled through line 54 to a fluid supply 56. The valve 52 preferably controls flow of fluid to the two inflatable members so as to permit flow to none (OFF), flow to one (for lateral or yaw control force generation) or flow to both (for longitudinal or pitch control force generation). A flight control 58 located inside the cockpit and operated by the pilot sends a control signal to a valve actuator 60 to effect changes in the valve position as required by the pilot. The fluid supply 56 may be any suitable source. For example, if the inflating fluid is air, the supply 56 could be a tap off the engine or a separate and self-contained unit such as an air compressor. The fluid could be a liquid as well as a gas, although gas is preferable due to weight and handling considerations.

Figure 9:
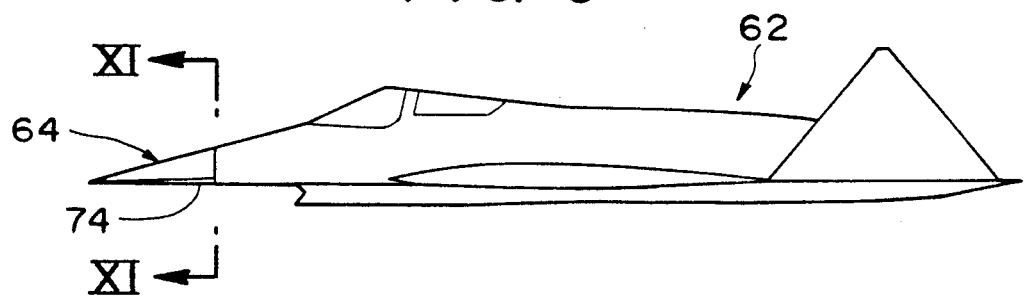
FIG. 9 is a side elevational view of an aircraft employing two deployable control surfaces according to another embodiment of the present invention.
Figure 10:
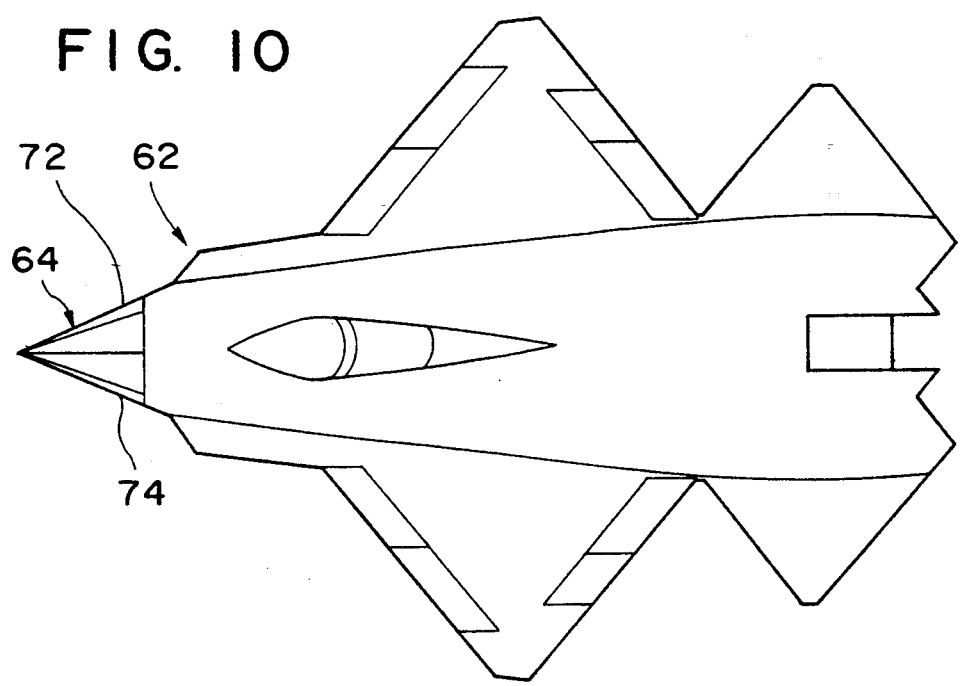
FIG. 10 is a top plan view of the aircraft of FIG. 9.
Figure 11:
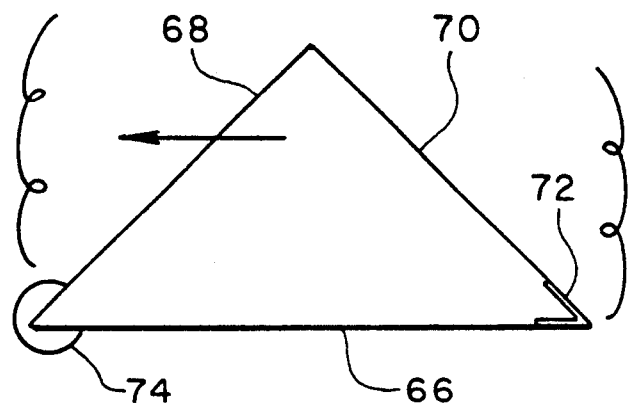
FIG. 11 is an enlarged transverse sectional view taken along line XI—XI of FIG. 10.

FIGS. 9-11 illustrate another type of aircraft 62 having an triangular in section forebody 64. The forebody 64 has a flat base 66 and two converging flat surfaces 68 and 70. This type of forebody geometry is referred to as "chined". Inflatable members 72 and 74 are disposed at the corners of the base 66 and the converging surfaces 68 and 70. As shown in FIG. 11, when the inflatable member 74 is inflated, a control surface is formed which effects the vortex in a manner that causes the forebody to move in the same direction as the deployed inflatable member 74. Thus, lateral control is in a direction opposite that of the previously-described embodiments in which the forebody has a near circular cross section. In the case of a chined forebody, the inflatable member delays separation and thus weakens the vortex, whereas in the circular forebody, the inflatable causes separation and thus strengthens the vortex on the deployed side, and thus causes lateral movement of the forebody in the opposite direction. As in the circular section forebodies, however, simultaneous deployment can effect longitudinal control forces.

Figure 12:
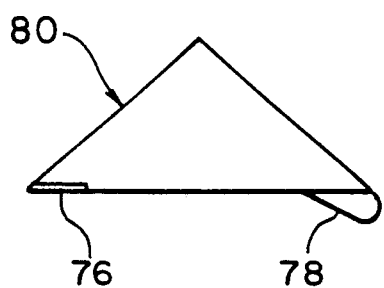
FIGS. 12-15 are views similar to FIG. 11 showing alternative placement of the inflatable members used to effect vortex control.
Figure 13:
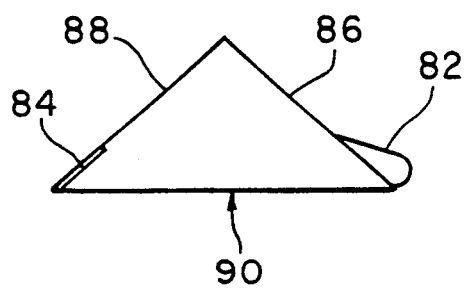
Figure 14:
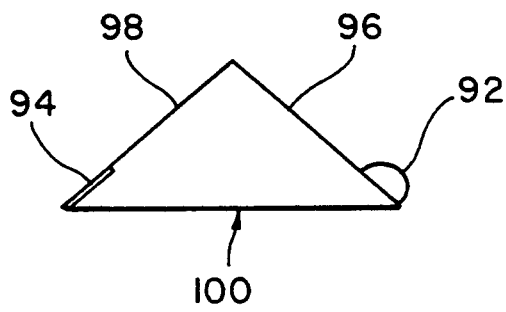
Figure 15:
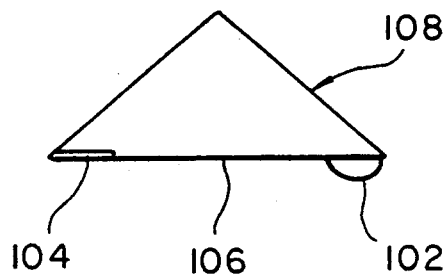

Alternative locations of the inflatable members for chined forebodies are illustrated in FIGS. 12-15. In FIG. 12, the inflatable members 76 and 78 are located on the base of the forebody 80. Member 78 is shown in the deployed position, inflated with a fluid and having a bulbous shape. In FIG. 13, two inflatable members 82 and 84 are shown on the converging surfaces 86 and 88, respectfully, of the forebody 90. Member 82 is shown in the deployed position, inflated with a fluid and having a bulbous shape. In FIG. 14, the inflatable members 92 and 94 are located on the converging surfaces 96 and 98, respectively, of the forebody 100. In the deployed condition, the members adopt a more rounded shape as compared to the embodiments of FIGS. 12 and 13. The inflatable members 102 and 104 of the embodiment of FIG. 15 are located on the base 106 of the forebody 108, and have the more rounded shape as in the case of the FIG. 14 embodiment.

For any of the embodiments of FIGS. 11-15, control and inflation of the inflatable members can be accomplished using the systems described with respect to the other embodiments. Also, the necessary structure for attaching the inflatable members to the forebody can be similar to the structure described with respect to the other embodiments.

While advantageous embodiments have been chosen to illustrate the invention, it will be understood by those skilled in the art that various changes and modifications can be made therein without departing from the scope of the invention as defined in the appended claims.

I claim:

1. An aerodynamic surface distention system for generating control forces on an aircraft, the system comprising:

first and second inflatable membranes disposed symmetrically on opposite sides of a forebody portion of the aircraft, each membrane being substantially flush with an outer surface of the forebody portion in a non-deployed position and extending radially outwardly of the forebody outer surface when in a deployed position, and each membrane defining an interior chamber and an exterior surface, the exterior surfaces of the first and second membranes comprising first and second control surfaces when inflated; and inflatable means for moving the first and second control surfaces from the non-deployed position to the deployed position at high angles of attack.

2. An aerodynamic surface distention system according to claim 1, wherein the first and second membranes are disposed symmetrically on opposite sides of a longitudinal, vertical plane of the aircraft.

3. An aerodynamic surface distention system according to claim 1, wherein the first and second membranes have a tapered thickness to define a pronounced apex and two substantially planar surfaces converging at the apex.

4. An aerodynamic surface distention system according to claim 1, wherein the inflatable means includes control means for alternately directing an inflating fluid to the two inflatable membranes, a yaw force being generated in a direction opposite the side of the inflatable membrane supplied with inflating fluid.

5. An aerodynamic surface distention system according to claim 1, wherein the inflatable means comprises first and second inflatable membranes fixedly connected to the aerodynamic skin and are in fluid communication with a supply of pressurized fluid and vacuum and the membranes are moved to an operative position when each membrane is inflated with pressurized fluid.

6. An aerodynamic surface distension system for generating control forces on an aircraft having a forebody, the system comprising:

first and second inflatable members disposed on opposite sides of the forebody symmetrically about a vertical plane of the aircraft; and means for selectively inflating the first and second inflatable members to effect a desired control force at high angles of attack.

7. An aerodynamic surface distension system according to claim 6, wherein the forebody has a conical shape and the inflating means includes control means for directing an inflating fluid to one of the two inflatable members, a yaw force being generated in a direction opposite the side of the inflatable member supplied with inflating fluid.

8. An aerodynamic surface distension system according to claim 6, wherein the forebody has a conical shape and the inflating means includes control means for directing an inflating fluid to the two inflatable members simultaneously to thereby generate a pitch force.

9. An aerodynamic surface distension system according to claim 6, wherein the forebody has a triangular wedge shape and the inflating means includes control means for directing an inflating fluid to one of the two inflatable members, a yaw force being generated in the same direction as the side of the inflatable member supplied with inflating fluid.

10. An aerodynamic surface distension system according to claim 6, wherein the forebody has a triangular wedge shape and the inflating means includes control means for directing an inflating fluid to the two inflatable members simultaneously to thereby generate a pitch force.

11. An aerodynamic surface distension system according to claim 6, wherein the forebody has a triangular wedge shape and includes a base and two converging surfaces which define two lower corners with the base, and the two inflatable members are disposed respectively at the two lower corners.

* * * * *